T. E. WEST.
CULTIVATOR.
APPLICATION FILED JUNE 1, 1918.
1,298,841.
Patented Apr. 1, 1919.
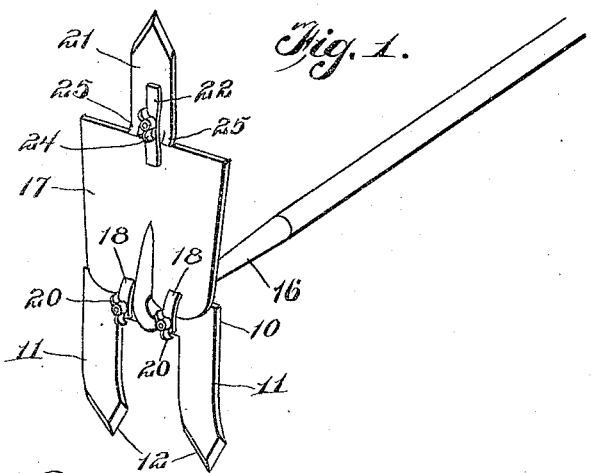
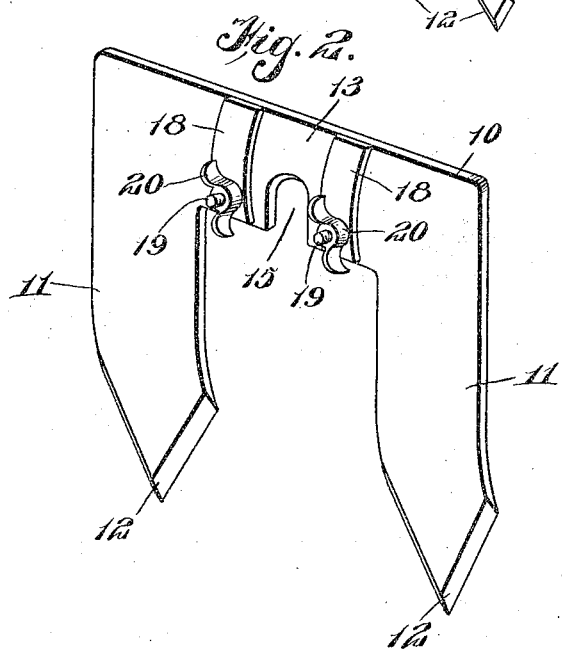
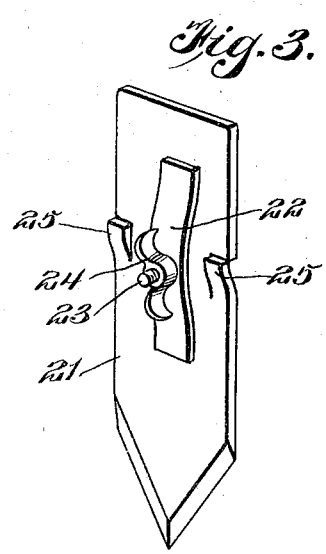
Inventor
Thomas E. West
By C. C. Hines,
Attorney

UNITED STATES PATENT OFFICE.

THOMAS E. WEST, OF OAK PARK, ILLINOIS.

CULTIVATOR.

1,298,841.  Specification of Letters Patent.  Patented Apr. 1, 1919.

Application filed June 1, 1918. Serial No. 237,752.

*To all whom it may concern:*

Be it known that I, THOMAS E. WEST, a citizen of the United States, residing at Oak Park, in the county of Cook and State of Illinois, have invented new and useful Improvements in Cultivators, of which the following is a specification.

The object of the invention is to provide a simple and inexpensive hand cultivator in the form of an attachment applicable to an ordinary gardening or cultivating hoe designed to serve as a means of supplementing a hoe in providing for cultivating and hilling close to stands of young plants, of marking or forming a shallow trench or drill for planting, and for covering or filling after the planting operation, and otherwise to adapt the ordinary garden hoe to perform a number of functions which are impossible with a blade of the usual form.

Further objects and advantages will appear in the course of the following description it being understood that changes in form, proportion and details may be resorted to within the scope of the appended claims without departing from the spirit of the invention.

In the drawing,

Figure 1 is a perspective view of the device embodying the invention applied in the operative position to a hoe blade, both elements of the apparatus being shown as when adapted for interchangeable use in forming a seed drill and covering or filling the same.

Fig. 2 is a detail view of the filling member.

Fig. 3 is a similar view of the drill forming member which is also adapted for use as a means of uprooting weeds and particularly removing dandelion and other roots from lawns and where it is desirable to avoid any considerable disturbance of the soil.

In the illustrated embodiment of the invention the cultivating and covering member 10 is provided with spaced blades 11, preferably reduced to form V-shaped cutting edges 12 and connected at their upper ends by a cross bar 13. In this cross bar is formed a seat or notch 15 designed to receive the shank 16 of a hoe of the ordinary type having the usual blade 17, and connected with said cross bar are the arched or bowed clamp plates 18 secured by bolts 19 and thumb nuts 20. Said clamp plates are preferably arched or deflected at their centers from the plane of the cross bar, and are of yielding material such as steel, so that when the cross bar is arranged in contact with one surface of the hoe blade and the free ends of the clamp members are arranged in contact with the opposite surface of said blade, the tightening of the thumb nuts will serve to lock the attachment firmly to the hoe blade with the edge of the latter in contact with the bolts 19, so that in the operation of the device the striking of the extremities of the attachment blades upon the ground will not tend to disturb the relation between the attachment and the hoe blade.

The other member of the attachment is of single blade form as shown at 21, preferably shaped as described with reference to the blades of the member 10 and having a spring metal clamp element 22 held in place by a bolt 23 and thumb nut 24. Preferably on either side of the clamp there is provided a stop or shoulder 25 to form a bearing for the cutting edge of the hoe blade, so that when the thumb nut is tightened to place the clamp plate 22 under tension, the parts are firmly locked to prevent relative displacement of the blade 21.

While either of the members of the attachment may be used in connection with a hoe blade, independently of the other, as when only cultivating is being done, or when only the operation of weeding a lawn is being performed, that an essential utility of the device resides in the fact that the members may be used interchangeably merely by a reversal of the hoe blade to produce the groove, trench or drill for the reception of the seeds in planting and for covering or filling said groove or drill after the seeds have been deposited, and that in cultivating stands of young plants in rows or otherwise the member provided with a plurality of blades may be advantageously employed with the blades on either side of the row, so that the soil may be readily drawn into contact with the plant stems from opposite directions, while the small weeds are removed or destroyed at a time in the growth of the crop when such treatment is of the greatest importance.

Having thus fully described my invention, I claim:—

1. A cultivating attachment for hoe blades having a member for arrangement in contact with one surface of the hoe blade, and a spring clamping member for engagement with the opposite surface of said blade, and means for adjusting said clamping member.

2. A cultivating attachment for hoe blades having elements for engagement respectively with opposite surfaces of said blade, stops for limiting the relative movement of the attachment with reference to the blade, and means for relatively adjusting said elements to clamp the hoe blade therebetween.

3. A hoe blade attachment having a cross bar and a plurality of blades connected therewith, said cross bar being provided with a hoe shank seat, and clamping means for coöperation with the cross bar to engage a hoe blade.

4. A hoe blade attachment having a plurality of blades and a connecting cross bar, arched clamp plates carried by the cross bar in coöperative relation with the same to engage an interposed hoe blade, and means for adjusting said clamp plates relative to the cross bar.

In testimony whereof I affix my signature.

THOMAS E. WEST.

Copies of this patent may be obtained for five cents each, by addressing the "Commissioner of Patents, Washington, D. C."